May 13, 1941.  T. IWASAKI ET AL  2,241,998
TRAFFIC SIGNALING SYSTEM
Filed April 21, 1937  2 Sheets-Sheet 1

Inventors:
Tadashi Iwasaki,
Fukuma Tsuji,
by Harry E. Dunham
Their Attorney.

May 13, 1941.　　T. IWASAKI ET AL　　2,241,998

TRAFFIC SIGNALING SYSTEM

Filed April 21, 1937　　2 Sheets-Sheet 2

Inventors:
Tadashi Iwasaki,
Fukuma Tsuji,
by Harry E. Dunham
Their Attorney.

Patented May 13, 1941

2,241,998

UNITED STATES PATENT OFFICE 2,241,998

TRAFFIC SIGNALING SYSTEM

Tadashi Iwasaki and Fukuma Tsuji, Tokyo, Japan, assignors to General Electric Company, a corporation of New York Application April 21, 1937, Serial No. 138,242
In Japan May 29, 1936

4 Claims. (Cl. 177—337)

Our invention relates to traffic signaling systems, and more particularly to that type of system wherein traffic is progressively controlled so that a vehicle traveling at a specified speed will not be stopped at any intersection within the system.

One object of our invention is to provide means for indicating the speed for which the system is adjusted and for changing that indication simultaneously with the changing of said adjustment.

For a better understanding of our invention together with other and further objects thereof, reference is had to the following description taken in connection with the accompanying drawings, and its scope will be pointed out in the appended claims.

Figure 1:
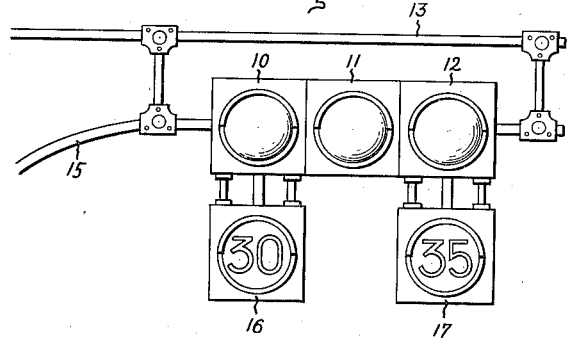
Figure 2:
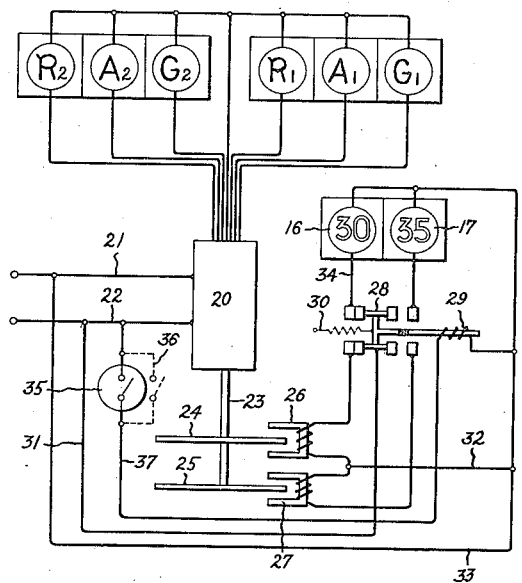
Figure 3:
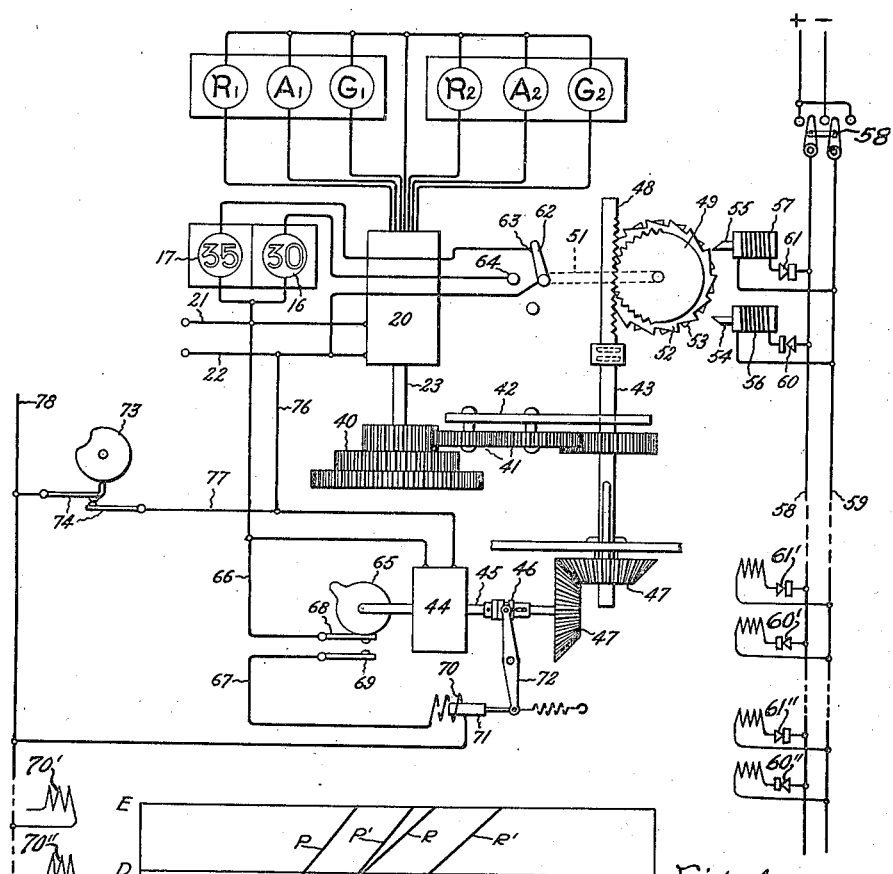

In the accompanying drawings, Fig. 1 is a front elevation of one form of traffic signaling unit having attached thereto means for indicating the speed of progression; Fig. 2 is a diagrammatic illustration of a system embodying apparatus for energizing the speed indicating means simultaneously with an adjustment of the traffic signal controller; Fig. 3 is a diagrammatic illustration of another form of apparatus wherein the progression indicating means are energized simultaneously with the adjustment of the traffic signal controller and Fig. 4 is a sample traffic signal chart for use in determining signal timing.

Referring to the drawings in detail, Fig. 1 illustrates a group of three traffic signals 10, 11, and 12, arranged horizontally on a bracket 13. The signals 10, 11 and 12 comprise, respectively, a casing having mounted therein an electric lamp behind a suitable lens which in the preferred form of the apparatus include the colors green, amber, and red; green to indicate "go," amber to indicate "caution," and red to indicate "stop." Current to the lamps behind the respective lenses is carried through a conduit 15. Suspended from the signals 10 and 12 are similar signals 16 and 17, the lenses of which bear the numerals indicating the miles per hour speed at which the vehicles are intended to proceed. The numerals shown are 30 and 35 respectively, but may be any numerals determined by the local regulations. The current to the lamps behind these speed indicating lenses may also be obtained through conductors within the conduit 15.

In Fig. 2, we have illustrated diagrammatically a controller 20 from which conductors project to two groups of signals $R_2$ $A_2$ $G_2$ and $R_1$ $A_1$ $G_1$. The group of signals indicated by $R_2$ $A_2$ $G_2$ may be considered as the "stop," "caution," and "go" signals for a main street, and $R_1$ $A_1$ $G_1$ may be considered as the "stop," "caution," and "go" signals for the intersecting cross street. The controller 20 may be any suitable circuit controller provided with a set of contacts continuously operable to energize the signals R, A and G successively through a predetermined cycle. Current to supply the signal lamps is fed to the controller through the conductors 21 and 22, and the controller is operated by a shaft 23 upon which are mounted disks 24 and 25, moved respectively by stators 26 and 27. Only one of the stators 26 and 27 is energized through a switch 28 which is moved into one position by the energization of a coil 29, and into a second position by a spring 30, when the coil 29 is deenergized. In the diagram of Fig. 2, the coil 29 is illustrated as being deenergized, the spring 30 as holding the switch in a position in which the stator 26 is energized and simultaneously, the signal 16 is energized. The circuits for the stator 26 and the signal 16 may be traced from supply conductor 22, through a conductor 31, to the movable contact of switch 28, through the switch to the stator coil 26, conductor 32, conductor 33, and supply conductor 21; also through the switch and a conductor 34 to signal 16, and through the return conductor 33 to supply conductor 21. The switch 28, therefore, establishes two circuits, one through the stator coil 26, and one through the signal 16. If now it is desired to change the rate of progression, the coil 29 is energized through the closure of a time switch 35, or a manually operated switch 36 which establishes a current circuit from supply conductor 22, through conductor 37 to coil 29, and through conductor 33 back to supply conductor 21. The coil 29 being thereby energized, moves the switch contacts to break the circuit through the stator 26 and the signal 16, and establishes a circuit through the stator 27 and the signal 17. The movement of the shaft 23 is thereby speeded-up and the cycle length of the intersection signals is shortened and, simultaneously, a second signal indicating a 35 mile, that is, a higher speed of progression, is energized. It has been found that the speed of progression, that is, the time interval between the starting instants of the "go" signals for successive controllers along any one street is inversely proportional to the cycle length. Stating it in another way, the relation of cycle length and speed of progression may be expressed by an equation $xy = k$, in which $k$ is a constant, and $x$ and $y$ are respectively, speed of progression, and length of time cycle. This equation may be explained with the aid of a chart such as is illustrated in Fig. 4.

Figure 4:
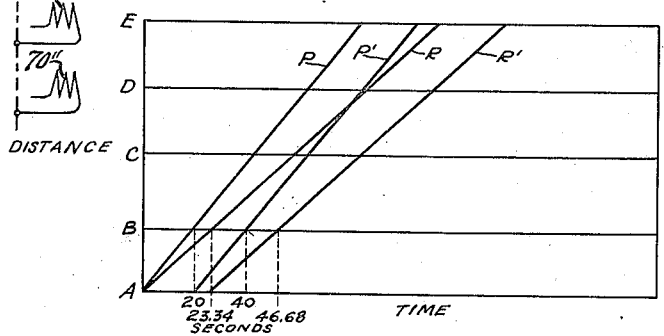

Fig. 4 is a traffic signal time chart such as may be plotted for any given street. In this chart, the distances between intersections, such as A, B, C, etc. are plotted along the axis of the ordinates and time is plotted along the axis of the abscissas. Let us assume that a car starts at intersection A, which is in this chart at the intersection of the coordinates, and that the car is to travel towards intersection B at a constant speed of 35 miles per hour. The distance between intersection A and intersection B is assumed to be 1027 ft. It will, therefore, take that car 20 seconds to reach intersection B. If this car continues at that constant rate of speed, it will reach each succeeding intersection at time instants which can be determined by drawing a straight line from the intersection of the coordinates through the 20 second point on the horizontal line representing intersection B. We, therefore, designate by this straight line P the beginning of a traffic band. During the time that this car travels from intersection A to intersection B, the right of way at intersection B is in the opposite street, and for the sake of simplicity, we will consider the right of way at intersection A as terminating at the instant that the first car reaches intersection B. A car that passes the intersection A at this moment, therefore, marks the end of the group of vehicles which started with the first car, and we may represent this by a straight line P' drawn parallel to the line P. From this chart it is possible to determine the beginning and end of the right of way period at each intersection. Using the factors of the above illustration, we have $x$ of our equation equalling 35 miles per hour, and $y$ equalling 40 seconds, the total length of a time cycle. Our constant $k$ equals the product of the two, or 1400.

Assuming now that we want traffic to travel at a constant speed of 30 miles per hour on the same street, the first vehicle in this band starting from the intersection A will travel at that speed, and will reach intersection B approximately 23.34 seconds later. A straight line R drawn through these two points, therefore, marks the beginning of another band of traffic. If we have again an equal division of the time cycle, the last car may pass intersection A at the instant that the first car reaches intersection B. This car will also travel at the same constant speed and will represent the end of the traffic band. This may be represented by the straight line R' which is drawn parallel to the line R. In this present example, we have a total time cycle $y$ of 46.68 seconds and a speed $x$ of 30 miles per hour. Our product $k$ is again 1400 after making a slight allowance for the slight inaccuracy in the time cycle length incurred by not carrying the decimal beyond the second place.

The above chart and values are merely by way of illustration. In each highway, there are variables, such as distances between streets, differences in intensities of traffic in opposite directions on the same street and on intersecting streets. All of these factors must be taken into consideration when laying out a complete chart. The above equation, however, holds true for any set of conditions, and, consequently, by adjusting the speeds of the motors including the stators 26 and 27 and their respective disks 24 and 25 to obtain desired lengths of cycle, corresponding speeds of progression are obtained, and these rates of progression may be indicated on signals which are energized simultaneously with the respective stators.

In Fig. 3, we have diagrammatically illustrated another form of drive for the controller 20. In this figure, the controller shaft 23 is provided with a nest of gears 40 which are engaged respectively by a train of pinions 41 mounted on a bracket 42 which is pivoted, at one end, on a shaft 43. The shaft 43 is rotated by a motor 44 through a shaft 45, a clutch 46 and a set of beveled gears 47. The shaft 43 is also movable axially by a rack 48 and a pinion 49; the pinion 49 being mounted upon a shaft 51 together with a pair of ratchet wheels 52 and 53. The ratchet wheels are respectively movable by pawls 54 and 55, which are reciprocated by the energization of coils 56 and 57 respectively. The coils 56 and 57 are energized through a pair of conductors 58 and 59 and unidirectional cells 60 and 61, whereby when current is sent through the conductors 58 and 59 in one direction, one of the coils 56 and 57 is energized, and when this current is reversed, the other of the two coils is energized to respectively move the rack 48 in one of two directions so as to increase or decrease the gear ratio between the motor 44 and the controller shaft 23. In the arrangement shown, the energization of coil 57 increases the ratio between the shaft 43 and 23 to length the signaling cycle and energization of coil 56 decreases that ratio to shorten the cycle. On the shaft 51 a switch arm 62 is mounted and arranged to engage one of several switch contacts, and is operated simultaneously with that shaft. It is so arranged that when the ratio of transmission is low and the corresponding cycle length is short, the switch arm 62 will engage a contact 63 and will energize the signal 17 indicating a high speed of progression. When the ratio of transmission between the shafts 43 and 23 is increased so as to obtain a low speed of shaft 23 and correspondingly long traffic signaling cycle, the switch arm 62 will engage a contact 64 and thereby energize the signal 16 indicating a lower speed of progression. In this figure as indicated by cells 61', 60' and 61'', 60'', the conductors 58 and 59 may energize any number of pairs of coils 56 and 57, so that any number of controllers 20 may be regulated from a central control point. Any suitable reversing switch 58' may be provided at such central control point to connect the conductors 58, 59 to a suitable current source to produce a current flow through said conductors in one or the opposite direction. Furthermore, in order to maintain these controllers in synchronism, a cam 65 is provided on the shaft 45, and is arranged to periodically close a circuit through conductors 66 and 67 by moving a contact 68 into engagement with a contact 69. Closing the circuit by the cam 65 energizes a coil 70 which through its core 71 and an operating arm 72 opens the clutch 46. When this clutch is open, the controller 20 stops. In order to close the clutch again, the circuit of the clutch coil 70 is broken by a master cam 73 which periodically opens a circuit between contacts 74. The separation of these contacts 74 breaks a circuit between one terminal of a current supply from conductor 22, for example, through conductors 76 and 77, to a common conductor 78, to which other similar controllers as indicated by the coils 70' and 70'' may be connected.

We have therefore shown a practical means for indicating each of several speeds of progression for which the signals along the thoroughfare are set.

What we claim as new and desire to secure by Letters Patent of the United States, is:

1. In a traffic signaling system, the combination of a group of controllers arranged at successive street intersections to control respectively groups of traffic signals, means in each controller for affecting the operation of said controller to operate its group of signals at any one of a plurality of cycle lengths, signaling means associated with said groups of traffic signals respectively, and means controlled in response to a change of cycle length at each controller to operate said signaling means to indicate to traffic a speed of progression between the said groups of traffic signals corresponding to said cycle lengths respectively.

2. In a traffic signaling system the combination of a plurality of controllers, groups of signals operated thereby through predetermined cycles, means for operating said signals at any one of a plurality of cycle lengths, means for controlling said cycle lengths simultaneously from a central control point, and means associated with said group of signals energized at each adjustment of cycle length of said controllers for indicating to traffic respectively the speed of progression which is established between the controllers of said group at each cycle length of said system at each cycle length.

3. In a traffic signaling system, the combination of a group of signals, a circuit controller operable to energize said signals in a predetermined sequence, a motor, an adjustable speed gear transmission between said motor and said circuit controller, means for operating said gear transmission to change the speed of operation of said circuit controller and the corresponding cycle length of said signals, signaling means associated with said group of signals for indicating to traffic the speed of progression within the traffic signaling system which is established at each cycle length respectively, and switching means for controlling said last mentioned signaling means operated simultaneously with said gear transmission operating means.

4. In a progressive traffic signaling system for a plurality of street intersections, the combination of "stop" and "go" signals at each intersection, a plurality of "speed of progression" signals at each intersection associated with the "stop" and "go" signals and visible to the driver of an automobile, controllers for the "stop" and "go" signals including means for operating the controllers at different speeds to vary the lengths of the signal cycles and thus vary the "speed of progression" of the "stop" and "go" signals, and means operated simultaneously with said speed changing means to change the "speed of progression" signals correspondingly.

TADASHI IWASAKI.
FUKUMA TSUJI.

CERTIFICATE OF CORRECTION.

Patent No. 2,241,998.  May 13, 1941.

TADASHI IWASAKI, ET AL.

It is hereby certified that error appears in the printed specification of the above numbered patent requiring correction as follows: Page 2, second column, line 29, for the word "length" read --lengthen--; lines 45 and 46, strike out "as indicated by cells 61', 60' and 61'', 60''" and insert the same after "57" and before the comma in line 47; page 3, first column, line 24, claim 2, for "group" read --groups--; line 28, same claim, strike out "of said group at each cycle length"; and that the said Letters Patent should be read with this correction therein that the same may conform to the record of the case in the Patent Office.

Signed and sealed this 1st day of July, A. D. 1941.

(Seal)

Henry Van Arsdale,
Acting Commissioner of Patents.